May 2, 1944.  J. C. FULLER  2,347,737
MANUFACTURE OF DISPENSING CONTAINERS
Filed Nov. 14, 1942
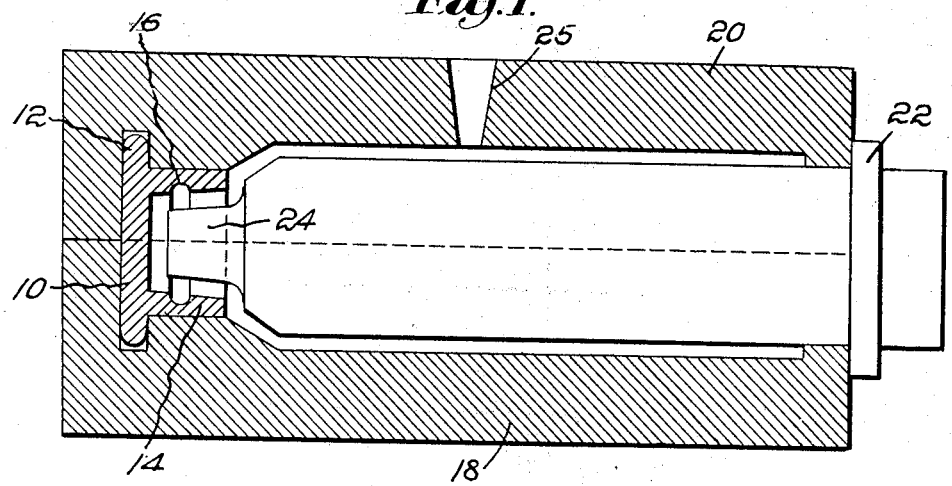
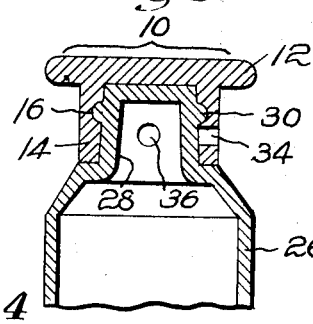
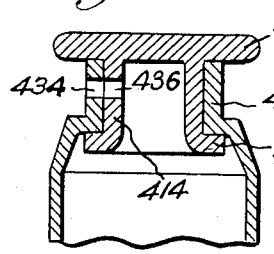
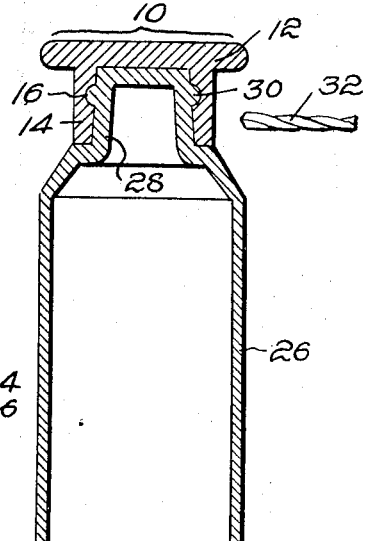
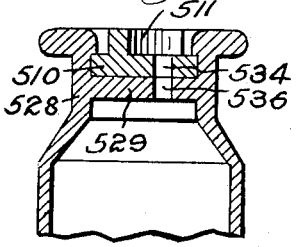
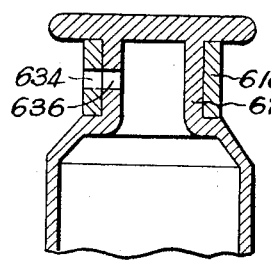
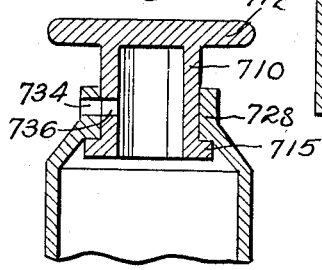
Inventor:
Joseph C. Fuller,
by Emery, Booth, Townsend, Miller & Weidner
Attys Patented May 2, 1944

2,347,737

UNITED STATES PATENT OFFICE 2,347,737

MANUFACTURE OF DISPENSING CONTAINERS

Joseph C. Fuller, Newton, Mass.

Application November 14, 1942, Serial No. 465,603

5 Claims. (Cl. 18—47.5)

This invention relates to the manufacture of dispensing containers and the object is to provide an improved method whereby there may be expeditiously and cheaply produced a container having a top portion and a closure proper associated therewith and relatively movable thereto to open and close the container in the manner of a valve.

In accordance with my invention I mold one of the valve-forming elements as an integral mass to fit the other with the two parts inseparably joined but capable of relative movement and then pierce the two parts in one position of relative adjustment to provide openings or ports which may thereafter be disaligned to close the container by the relative movement of the parts permitted by the method of connecting them.

My invention will be well understood by reference to the following description of certain illustrative embodiments thereof showing it as applied to a container of the collapsible tube type, such as is used for tooth paste and other commodities, and wherein—

Fig. 1 is a vertical section of a mold with one of the elements positioned therein in preparation for the molding of the second element;

Fig. 2 is a central vertical section through the product of the molding operation;

Fig. 3 is a similar view of the completed tube; and

Figs. 4, 5, 6 and 7 are views similar to Fig. 3 illustrating modifications.

Referring now to Figs. 1, 2 and 3, the tube produced by the method thereby illustrated embodies a closure proper or cap 10 which may be preformed of any suitable material, as, for instance, from a phenol-formaldehyde condensation product, and here shown as having an enlarged top 12 from which depends a sleeve or flange 14, the inner surface of which corresponds to a surface of revolution, herein being slightly conical. An annular groove 16 is provided in this inner surface defining shoulders for a purpose which will appear.

The preformed cap 10 may be positioned, as shown in Fig. 1, in a two-part mold comprising a drag 18, a cope 20 and a core 22 having a projection 24 which extends with suitable clearance into the hollow of the sleeve 14. The cavity defined by the mold and core may be then filled, through the gate 25 for example, with ethyl cellulose or similar plastic, as by the usual methods of injection molding so called, whereby a collapsible tube (see Figs. 2 and 3) is formed comprising a body 26 and a hollow neck portion 28 molded within the sleeve 14 of the cap and with the integrally formed rib 30 entering the groove 16 and therefore interlocking with the shoulders thereof so that the neck and cap are inseparably connected. Because the inner surface of the sleeve, however, is circular in section, the two parts may rotate one relative to the other, suitable precautions as common in the art being taken to prevent adherence of the molded mass of the neck 28 from adhering to the cap.

An opening may now be pierced laterally through the flange or sleeve portion 14 of the cap and the wall of the neck 28 which rests thereagainst to provide a dispensing passage, this being illustrated diagrammatically in Fig. 2 by the showing of a twist drill 32 presented to the sleeve, the passage being formed as it would be by an advance of that drill to the left in the figure. There is thereby formed an opening 34 in the flange of the cap and an opening 36 in the neck of the tube which may be disaligned, as shown in Fig. 3, by rotation of the cap on the tube. With the parts in the position of Fig. 3, the tube is closed, and when the holes are brought into alignment by relative rotation of the parts a passageway is provided through which the contents may be squeezed out.

It will be noted that no fitting of the parts is required. The point where the openings 34 and 36 are pierced is not confined within any close limits within the vertical length of the parts, viewing Fig. 2. For instance, suppose in the next tube the drill is higher or lower or disposed at somewhat of an angle. The tube thus formed would be different from the preceding but in and of itself the parts would fit perfectly and the openings 34 and 36 be in perfect alignment in the dispensing position. It will therefore be seen that even if the steps of the method as herein described were relatively crudely performed, each article would nevertheless in itself be "tailor made" with the parts perfectly correlated. Moreover, these steps are well adapted to large-scale mechanical practice.

In the example of the invention shown, the container has a main body 26 integral with the neck 28 and open at the lower end and it may be filled and closed at that lower end in the manner usual with collapsible tubes. Clearly this molded part might be a top or lid adapted for use with a separately formed container body.

In the construction shown in Fig. 3 the preformed cap or closure element 10 is the exterior or female member and the top of the container proper is the interior or male member. In Fig. 4 I show a reverse construction in which the preformed cap embodies a sleeve portion 414 with upper and lower flanges, 412 and 415 respectively, forming oppositely facing shoulders at either end of an intermediate cylindrical portion, and the neck portion of the container 428 is molded exteriorly about this cap, entering between the shoulders and fitting the cylindrical surface therebetween, the dispensing opening comprising the ports 434 and 436 being formed by piercing substantially radially of the cylinder, in the same manner as in the modification of Figs. 1 to 3.

In Fig. 5 the preformed closure member 510 is in the form of a flat plate, specifically a thin cylindrical disc. It may be provided with a projecting rib 511 forming a handle by which it may be turned. The neck of the container 528 is molded with a portion 529 extending across the inner base of this disc and the lateral portions extending around the cylindrical surface and marginally over the upper base for a short distance, the bases of the disc thus providing locking shoulders about which the neck is molded inseparably to secure the parts together. A piercing operation eccentric to the axis of the disc but substantially parallel thereto forms the openings 534 and 536 through the disc and the wall 529 which fits against it. Here again rotation of the closure opens and closes the dispensing passage.

In Fig. 6 the closure 610 is in the form of an elongated cylindrical sleeve. The hollow neck portion 628 is molded against the interior surface of the sleeve, extending through the same and having flange portions at either end overlying the bases of the sleeve which form locking shoulders to retain the same. Openings 634 and 636 are provided in the same manner as in Fig. 2.

In the constructions hitherto described the relative movement of the parts which operate the closure is one of rotation. Fig. 7 shows a construction in some respects similar to Fig. 4 but at least the outer surface of the sleeve 710 is non-circular and may be prismatic, say hexagonal, as indicated in the figure by the vertical lines indicating the interior angles. The sleeve is provided with an upper flange 712 and a lower flange 715. The neck 728 of the container is molded to fit the exterior surface of the sleeve between these flanges but is of shorter vertical dimension than the distance between them so that when the parts are completed and removed from the mold the cap may be reciprocated vertically, viewing Fig. 7, within the neck 728. In one position of relative adjustment of the parts, say the raised position of the cap as shown in Fig. 7, the holes 734 and 736 are pierced by a single piercing operation. By pressing down the cap from the position shown in Fig. 7 the hole 736 is brought out of alignment with the hole 734 and the container is closed.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. The method of producing a dispensing container comprising a top and a cooperating closure which together function as a valve characterized by preforming one of said elements with a peripheral portion constituting a surface of revolution having a shoulder, molding the other element as an integral mass in close fitting but non-adhering relation to said surface and about said shoulder to effect an inseparable connection of the parts in relatively rotatable relation, and piercing the so joined elements at a point removed from the axis of revolution.

2. The method of producing a dispensing container comprising a top and a cooperating closure which together function as a valve characterized by preforming one of the elements as a sleeve having spaced shoulders, assembling therewith the other element by molding the latter as an integral mass with a portion extending between the shoulders and fitting the sleeve in non-adherent relation thereto and capable of movement between said shoulders, and transversely piercing the sleeve and the adjacent portion in one position of relative adjustment thereof.

3. The method of making a dispensing container of the collapsible tube type which comprises preforming a cap having a surface circular in section and an annular retaining shoulder, molding the tube body as an integral mass with a neck positioned against said surface and about said shoulder in non-adherent but inseparable relation, and piercing the cap and neck by a hole transverse to the axis of the surface.

4. The method of producing a dispensing container comprising a top and a cooperating closure which together function as a valve characterized by preforming one of said elements as a plate, molding the other element as an integral mass in non-adherent relation over the bottom face of said plate, across the periphery and inward marginally of the upper face to effect a connection of said parts in a direction perpendicular to the plane of the plate while permitting relative movement in said plane, and piercing an opening directly through the plate and the underlying wall of the cooperating element in one position of adjustment of the parts.

5. The method of producing a dispensing container comprising a top and a cooperating closure which together function as a valve and wherein one element has a reduced portion bounded by shoulders and the other fits over the same with a portion entering between the shoulders to be retained thereby, which comprises preforming one of the parts and molding the other as an integral mass in non-adherent relation to the first to provide the shouldered connection while permitting a relative movement and piercing an opening directly through superposed portions of said parts in one position of adjustment thereof.

JOSEPH C. FULLER.